(No Model.)

H. H. ENGELMAN.
NECK YOKE.

No. 374,045.                    Patented Nov. 29, 1887.

Witnesses
Thos. O. Robertson
C. H. Raeder

Inventor
Harry H. Engelman
By his Attorney
T. J. W. Robertson

UNITED STATES PATENT OFFICE.

HARRY H. ENGELMAN, OF DEFIANCE, OHIO.

NECK-YOKE.

SPECIFICATION forming part of Letters Patent No. 374,045, dated November 29, 1887.

Application filed May 23, 1887. Serial No. 239,116. (No model.)

*To all whom it may concern:*

Be it known that I, HARRY H. ENGELMAN, of Defiance, in the county of Defiance and State of Ohio, have invented new and useful Improvements in Neck-Yokes; and I do hereby declare that the following is a full, clear, and exact description thereof, reference being had to the accompanying drawings, which form a part of this specification.

This invention relates to certain new and useful improvements in neck-yokes; and the invention consists in the peculiar construction and arrangement of the parts, all as more fully hereinafter set forth.

Figure 1:
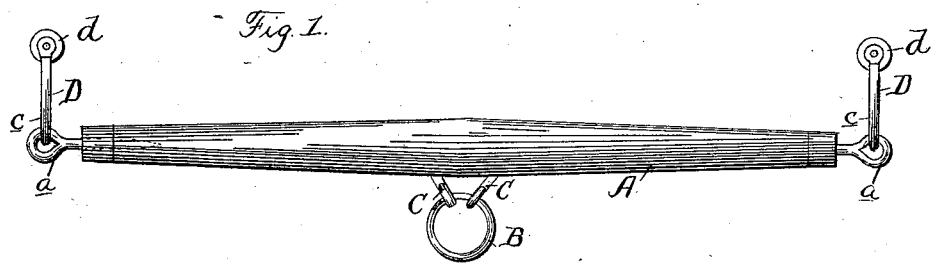
Figure 2:
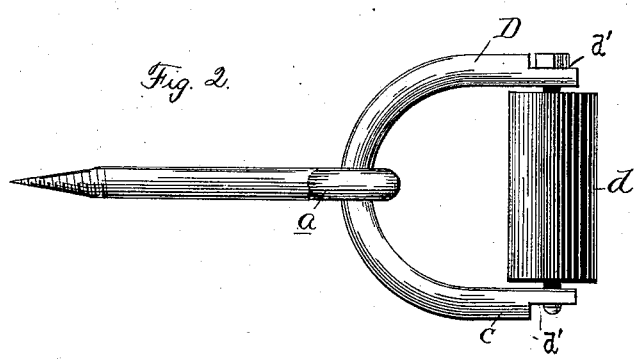
Figure 3:
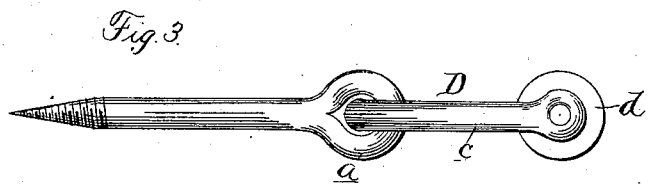

Figure 1 is an elevation of my improved neck-yoke. Fig. 2 is a detached view of one of the yoke-couplings. Fig. 3 is a side view of the same.

In the accompanying drawings, which form a part of this specification, A represents the neck-yoke bar, which is tapering in either direction from the center, as in the ordinary manner, and has centrally secured to it the pole-ring B by means of eyebolts C, or in any other suitable way.

D are the yoke-couplings, each consisting of a threaded eyebolt, $a$, screwed into the end of the yoke-bar, which is provided with a band or ferrule, to prevent its splitting.

$c$ is a circular stirrup loosely engaged in the eye of the eyebolt $a$ and carrying an anti-friction roller, $d$, secured by a rivet-pin between the open ends of the stirrup.

The ends of the yokes D are each halved out or cut away, as shown at $d'$ in Fig. 2, so that when the spindle of the roller is in place the head thereof and the nut on the other end will not project beyond the yoke, thus avoiding all danger of scratching or injuring the horse or tearing the clothes of the attendant. This is important.

In practice the ordinary breast-strap of the harness passes freely over the anti-friction rollers $d$, and as the stirrup can adjust itself in any direction the wear and tear on the harness and on the neck of the animal occasioned by neck-yokes of ordinary construction is greatly lessened, while the device is at once simple and readily secured in place.

What I claim as my invention is—

The neck-yoke described, consisting of the bar A, the eyebolts $a$, secured in the ends thereof in line therewith, the yokes D, having their ends cut away or halved out, as at $d'$, and loosely engaging the eyes of said bolts.$a$, the spindles passed through holes in the ends of said yokes, the rollers $d$ on said spindles, and the nuts on the ends of said spindles flush with the outer surface of said yokes, substantially as shown and described, and for the purpose specified.

HARRY H. ENGELMAN.

Witnesses:
 M. E. ORCUTT,
 M. J. ROURKE.